United States Patent
von Wendorff

(10) Patent No.: US 6,509,849 B2
(45) Date of Patent: Jan. 21, 2003

(54) METHOD AND DEVICE FOR DIGITALLY CODING BINARY DATA WITH A PARTICULAR TRANSMIT SIGNAL SPECTRUM

(75) Inventor: Wilhard Christophorus von Wendorff, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/899,665

(22) Filed: Jul. 5, 2001

(65) Prior Publication Data

US 2002/0008647 A1 Jan. 24, 2002

(30) Foreign Application Priority Data

Jul. 7, 2000 (DE) .......................... 100 33 130

(51) Int. Cl.[7] ........................... H03M 5/00; H04L 25/34
(52) U.S. Cl. .......................... 341/58; 375/292
(58) Field of Search .................. 341/58, 59, 68, 341/70; 360/41; 378/242, 292, 258, 333

(56) References Cited

U.S. PATENT DOCUMENTS

| 3,405,235 A | | 10/1968 | Carter | |
| 4,501,000 A | * | 2/1985 | Immink et al. | 375/242 |
| 4,523,181 A | * | 6/1985 | Tazaki et al. | 341/58 |
| 4,731,797 A | | 3/1988 | Jaffre et al. | |
| 5,022,051 A | | 6/1991 | Crandall et al. | |
| 5,699,061 A | * | 12/1997 | Shimpuku | 341/59 |
| 5,786,950 A | * | 7/1998 | Zook et al. | 360/41 |
| 6,133,861 A | * | 10/2000 | Jusuf et al. | 341/68 |

FOREIGN PATENT DOCUMENTS

DE   199 27 751 A1   12/1999

* cited by examiner

Primary Examiner—Patrick Wamsley
(74) Attorney, Agent, or Firm—Jenkins & Wilson, P.A.

(57) ABSTRACT

A coding device for coding binary data with a particular transmit signal spectrum, the coding device having a data stream separating device for separating a data stream, which consists of the binary data to be coded, into data blocks having a predetermined data block length, a calculating device for calculating the difference between the number of binary data having a second binary state, for each data block, and a transmitting device for transmitting each data block as transformed data block or as non-transformed data block via a communication channel connected to the transmitting device, in such a manner that the total sequence of the data blocks transmitted by the transmitting device on the communication channel exhibits the particular transmit signal spectrum.

10 Claims, 5 Drawing Sheets

US 6,509,849 B2

1

METHOD AND DEVICE FOR DIGITALLY CODING BINARY DATA WITH A PARTICULAR TRANSMIT SIGNAL SPECTRUM

TECHNICAL FIELD

The invention relates to a method and to a device for digitally coding binary data with a particular predetermined transmit signal spectrum on a communication channel, especially a serial data bus.

RELATED ART

The data throughput and the data transmission rates on multiplexed communication buses are increasing more and more. By comparison, the quality of the communication channels used, for example of the data lines of a communication bus, has not significantly increased. Due to the high transmission rates, electromagnetic radiation occurs on the data lines so that the electromagnetic compatibility EMC decreases. To achieve high electromagnetic compatibility EMC, therefore, the data transmitted via the communication channel by a transmitting device are coded. The main coding methods used in this connection is the NRZ (Non-return to zero) coding method.

FIG. 1 diagrammatically shows the transmission of data from a data source DQ to a data sink DS via a communication channel K. The communication channel K is, for example, a data bus line of a serial data bus to which a number of controllers are connected which transmit and receive, respectively, data via transmitting devices S and receiving devices E, respectively. As an alternative, the communication channel K can also be a wireless transmission link as used in mobile radio.

FIG. 2 shows a typical interference signal spectrum of a communication channel K. In a low frequency range from 0 Hz up to a first frequency $f_a$, the interference signal spectrum caused by interference signals has a relatively high level. The interference signals occurring in this range are mainly caused by poor ground contacts between the controllers and the communication channel or, respectively, the data transmission line. In a middle range of frequencies which extends from the first frequency $f_a$ up to a second frequency $f_b$, the levels of the interference signals occurring are relatively low. Above an upper limit frequency $f_b$, the levels of the interference signals increase considerably. In a vehicle system bus, for example, this is caused by high-frequency ignition interference signals.

The NRZ coding method performs data bit coding in the transmitting device S, in such a manner that the number of signal edges occurring in the coded signal is minimum. The result is that the coded signal transmitted in the communication channel K is below the upper limit frequency $f_b$, so that the transmitted coded signal will not be corrupted by any interference by high-frequency interference signals. However, the disadvantage of the NRZ coding method is that a long sequence of data bits which remain the same, for example a long sequence of data bits, output by the data source, all of which have a logical high state H, is transmitted via the communication channel by means of a coded transmit signal which has a very high direct-current signal component. The frequency of the coded signal transmitted is therefore below the lower limit frequency $f_a$ and is therefore exposed to a high-level interference spectrum.

A "Manchester coding method" has therefore been proposed in which a logical 0 output by the data source DQ is

2 output as a transmit signal 01 by the transmitting device S and in which each logical 1 output by the data source DQ is transmitted as a coded transmit signal 10 from the transmitting device S to the receiving device E. Although the Manchester coding method has the advantage that the signal transmitted via the communication channel no longer has a direct-current component, a considerable disadvantage consists in that the coded signal transmitted via the communication channel K has a very high frequency signal component. For example, a constant sequence of logical zeros which are output by the data source DQ is transmitted as an alternating sequence of zeros and ones via the communication channel K in the Manchester coding method so that the coded signal transmitted has a very high frequency. The high-frequency signal components of the Manchester-coded transmission signal are disturbed by the high-frequency interference signals, the frequency of which is above the upper limit frequency $f_b$, so that data transmission errors can occur.

SUMMARY OF THE INVENTION

It is, therefore, the object of the present invention to create a method and a device for digitally coding binary data in which the transmit signal spectrum of the coded transmit signal is in a frequency range having a minimum interference signal level.

According to the invention, this object is achieved by a method having the features specified in claim 1 and by a coding device having the features specified in claim 7.

The invention creates a method for digitally coding binary data with a particular transmit signal spectrum, the method exhibiting the following steps, namely separating a digital data stream, which consists of the binary data to be coded, into data blocks having a predetermined data block length, determining a difference between the number of binary data having a first binary state and the number of binary data having a second binary state, for each data block, transmitting each data block as negated data block or as non-negated data block via a communication channel, in such a manner that the total sequence of data blocks transmitted on the communication channel has a particular transmit signal spectrum.

In the method according to the invention, preferably at least one indicating data item which specifies whether the transmitted data block is transmitted negated or non-negated is added to each data block transmitted.

In an especially preferred embodiment of the method according to the invention, the binary data are transmitted NRZ-coded.

The data blocks transmitted in the method according to the invention preferably in each case exhibit the same data block length.

In a preferred embodiment of the method according to the invention, the particular transmit signal spectrum exhibits a minimum direct-current component.

The transmit signal spectrum preferably additionally exhibits a minimum high-frequency signal component.

The invention also creates a coding device for coding binary data with a particular transmit signal spectrum, the coding device exhibiting a data separating device for separating a data stream, which consists of the binary data to be coded, into data blocks having a predetermined data block length, a calculating device for calculating the difference between the number of binary data having a first binary state and the number of binary data having a second binary state, for each data block, the coding device also having a transmitting device for transmitting each data block as a data block which has been transformed with respect to data or has not been transformed, via a communication channel connected to the transmitting device, in such a manner that the total sequence of the data blocks transmitted by the transmitting device on the communication channel exhibits the particular transmit signal spectrum.

The communication channel is preferably either a data transmission line or a wireless transmission signal link.

BRIEF DESCRIPTION OF THE DRAWINGS

In the further text, preferred embodiments of the coding method according to the invention and of the coding device according to the invention are described in order to explain features essential to the invention, referring to the attached figures, in which.

DETAILED DESCRIPTION OF THE INVENTION

Figure 3:
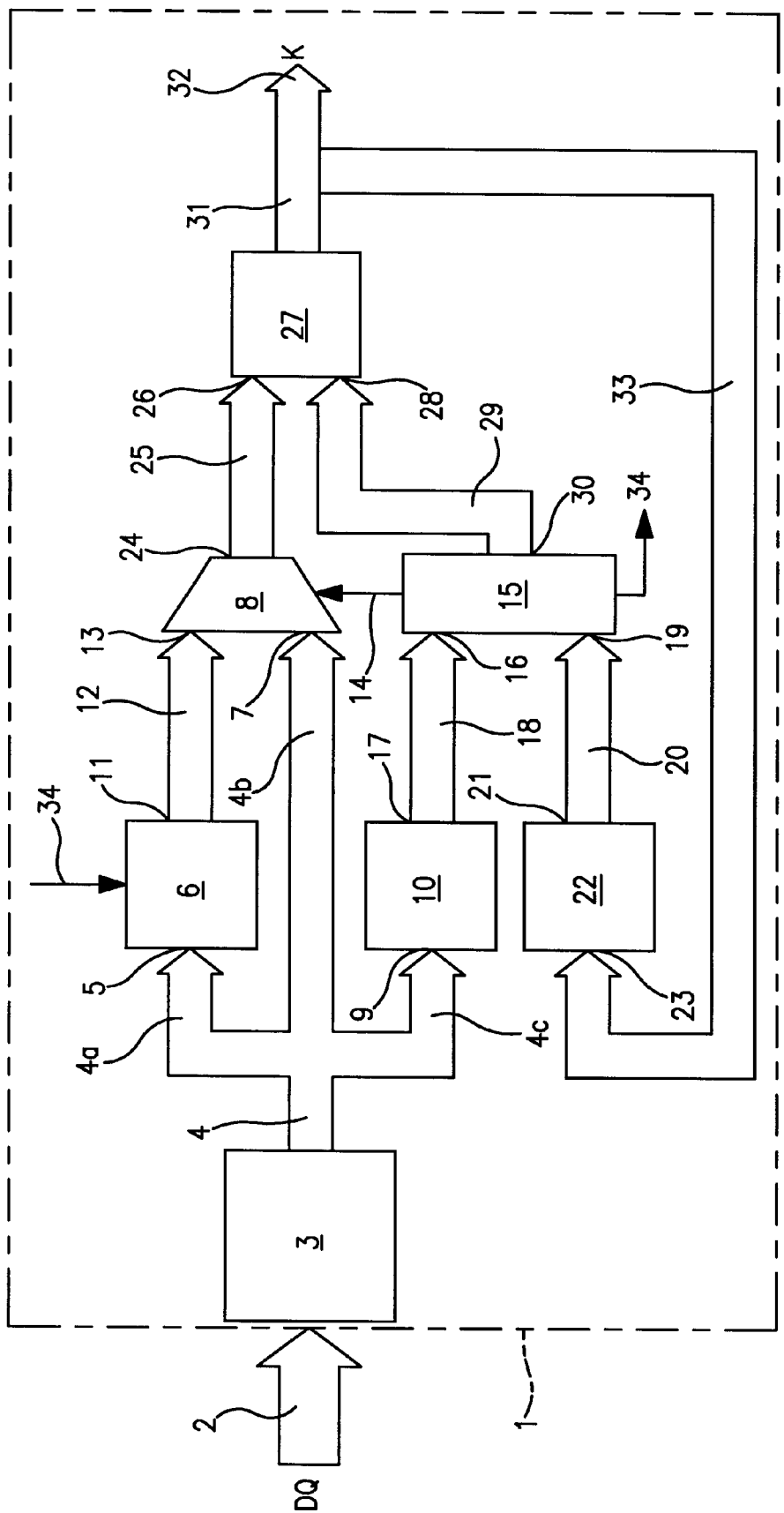
FIG. 3 shows a preferred embodiment of the coding device according to the invention for coding binary data with a particular transmit signal spectrum.

FIG. 3 shows a preferred embodiment of the coding device 1 according to the invention for coding binary data which are delivered serially or in parallel by a data source DQ via data lines 2 to a data separating device 3 of the coding device 1. The data separating device 3 for separating the data stream present on the data lines 2, which stream consists of the binary data to be coded, separates the binary data which are present into data blocks DB having a predetermined data block length. The data blocks formed in this manner are applied via internal data lines 4 to a data input 5 of a computer operation device 6, to a first data input 7 of a multiplexer 8 and to a data input 9 of a counting device 10.

The signal output 11 of the transformation device or computer operation device 6 is present at a second input 13 of the multiplexer 8 via data lines 12. The multiplexer 8 is driven by a controller 15 via a selection control line 14. The controller 15 has a first counter signal input 16 for receiving a first counting signal transmitted from the counter device 10 via a data output 17 and via data lines 18. The controller 15 also has a second counter signal input 19 which is connected to a data output 21 of a second counting device 22 via data lines 20. The counting device 22 has a data input 23.

The output 24 of the multiplexer 8 is present at a first input 26 of a transmitting device 27 via data lines 25. The transmitting device 27 has a second data input 28 for accepting the indicating data output via data lines 29 via associated data outputs 30 from the controller. The transmitting device 27 outputs a coded transmit signal via signal lines 31 to a signal output 32 of the coding device 1, the signal output 32 being connected to the communication channel K. The transmit signal lines 31 are fed back to the data input 23 of the second counting device 22 via lines 33.

The data to be coded, which are output by the data source DQ, are binary data, i.e. they have a first binary state and a second binary state. The data stream is separated into data blocks of a predetermined data block length by the data stream separating device 3. The data block length is preferably adjustable. The data blocks are supplied via data lines 4 to the transformation or computer operation device 6 which is preferably driven by the controller 15 via a control line 34. The computer operation device 6 performs a mathematical operation or, respectively, logical transformation for each data block. The data transformation preferably consists in that the data blocks are in each case negated, i.e. the data bits contained in the data blocks are inverted.

The counting devices 10, 22 determined the difference between the number of binary data having a first binary state and binary data having a second binary state, for each data block DB formed by the data stream separating device 3. For each data block DB formed, the binary state distribution is determined. In this context, a first binary state distribution A of all data blocks transmitted or coded is accumulated together without the last data block to be coded, and a second binary state distribution B of all data blocks transmitted or coded is accumulated together including the last data block DB to be coded.

Figure 4:
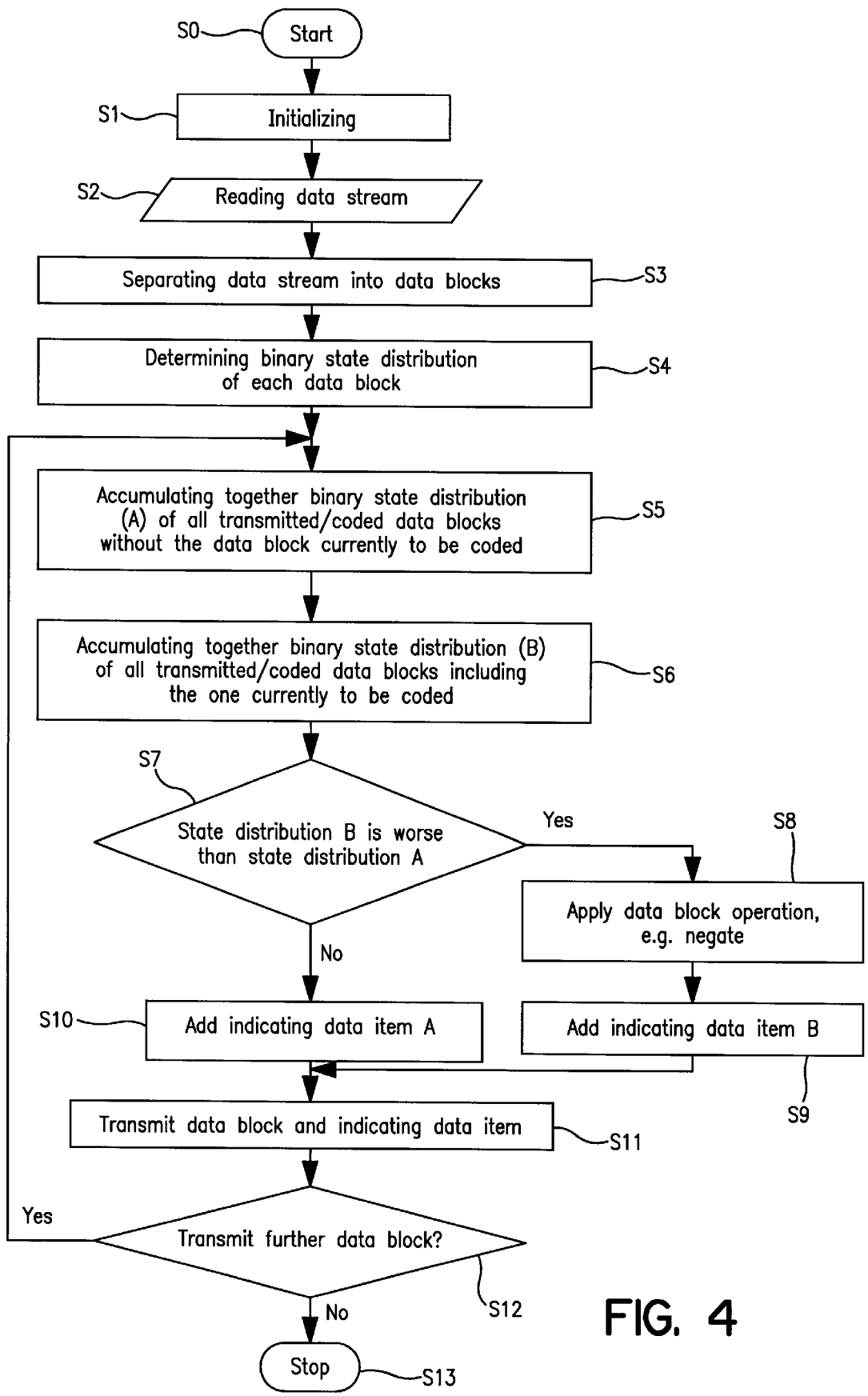
FIG. 4 shows a flow chart of a preferred embodiment of the method according to the invention for digitally coding binary data with a particular transmit signal spectrum.

FIG. 4 shows a flow chart of the coding method performed by the coding device 1 shown in FIG. 3.

After a starting step S0, the coding device 1 is initialized and, in particular, the counting devices 10, 22 are reset.

In a step S2, the data stream to be coded, which is present at data lines 2, is read serially or in parallel into a data buffer of the data stream separating device 3.

In a step S3, the data stream separating device 3 separates the data stream, which has been read in, into data blocks having a predetermined data block length. Each data block has a predetermined number of data bits.

In a step S4, the binary state distribution is determined for each data block formed, the number of data bits having a first binary state and the number of binary data bits having a second binary state are determined.

In a step S5, a first binary state distribution A of all data blocks transmitted or coded is accumulated together without the last data block DB to be coded. This binary state distribution A specifies for the total sequence of all coded data blocks already transmitted via the communication channel K whether more data bits have been transmitted in a first logical state, for example a logical high state H, or more data bits have been transmitted in a logical low state L, by the coding device 1 via the communication channel A. In step S5, however, the data bits of the last data block DB to be coded are not taken into consideration.

In a step S6, a second binary state distribution B of all coded data blocks DB which have been transmitted, including the data block currently to be coded or last data block, respectively, is accumulated together.

In a step S7, the controller 15 compares if the second state distribution B, i.e. including the last data block DB to be coded, is worse than the first state distribution A, i.e. without the last data block to be coded. In this process, the greater the deviation of the transmit signal spectrum from the desired predetermined transmit signal spectrum, the worse the state distribution.

If it is found in step S7 that the second binary state distribution B of the total sequence of coded data blocks transmitted, including the data block currently to be coded, is worse than the first state distribution A without the data block DB currently to be coded, the controller 15, in step S8, drives the computer operation unit 6 via the control line 34 to perform a logical data transformation. The data transformation preferably consists in the data bits of the data block DB currently to be coded being individually negated or inverted, respectively. The negation is preferably performed by an inverter which, for example, contains an XOR gate. The controller 15 drives the multiplexer 8 via the selection line 14 in such a manner that the first multiplexer input 13 is switched through to the multiplexer output 24 so that the negated last data block DB reaches the signal input 26 of the transmitting device 27.

In a step S9, the controller 15 generates an indicating data item B which indicates that the data block is transmitted negated. This indicating data item generating is applied to the input 28 of the transmitting device 27 via the output 30 and the data lines 29 of the controller 15 and is inserted into the data block DB, which is to be transmitted, as an additional bit or data item, respectively.

If it is found in step S7 that the second binary state distribution B is better than the first binary state distribution A, no data transformation is performed on the data block DB. For this purpose, the controller 15 switches the multiplexer 8 via the selection line in such a manner that the multiplexer input 7 is switched through to the multiplexer output 24. In a step S10, an indicating data item A which indicates that the data block is not negated is added to the data block.

In a step S11, the transmitting device 27 codes the transformed or non-transformed data block including the inserted indicating data item A, B, which is present at input 26, with an NRZ coding method and outputs it via data line 31 to output 32 of the coding device 1.

In a step S12, the controller 15 determines whether another data block is to be transmitted or not. If another data block DB is to be transmitted, the method returns to step S5. If no further data block is to be transmitted, the coding method is terminated in step S13.

Figure 5:
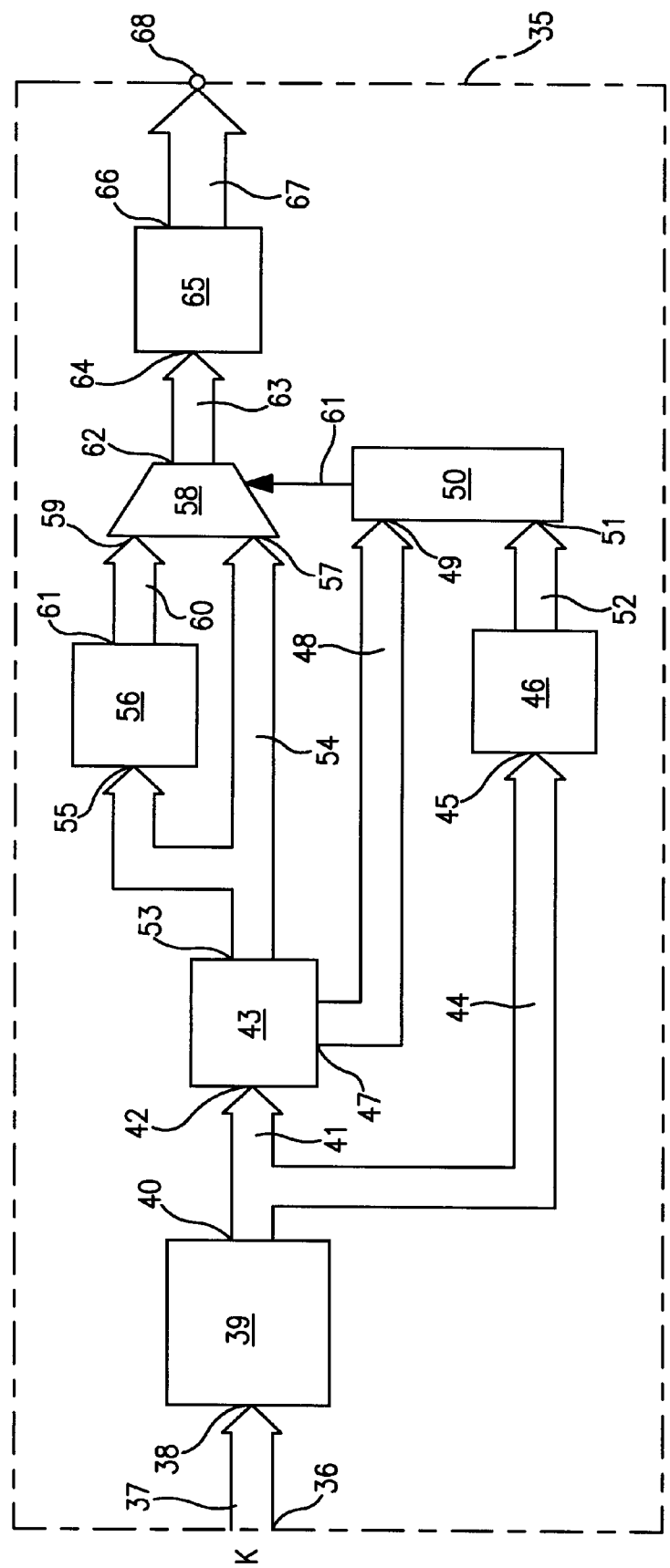
FIG. 5 shows a corresponding decoding device according to the invention, belonging to the coding device according to the invention.

FIG. 5 shows in a block circuit diagram a data decoding device 35 for decoding transmit data which have been coded in accordance with the coding method according to the invention. The decoding device 35 has a data input 36 which is connected to the communication channel K. The data input 36 is connected to a signal input 38 of a data receiving device 39 via data lines 37. The data receiving device 39 receives the transmitted coded data blocks which are temporarily stored in the receiving device 39. At the output end, the receiving device 39 is connected via a signal output 40 and data lines 41 to an input 42 of a data filter 43 for filtering out the indicating data item contained in the received data block. Furthermore, output 40 of the receiving device 39 is connected to data input 45 of a counting device 46 via data lines 44. In the counting device 46, the binary state distribution of all received data blocks is accumulated together. The filter device 43 is used for filtering out the indicating data item. The indicating data item filtered out by the filter device 43 is applied to an indicating data receiving input 49 of a controller 50 contained in the decoding device 35 via a data output 47 and data lines 48 by the filter device 43. The controller 50 has a second input 51 via which it is connected to an output of the counting device 46 by means of data lines 52.

The filter device 43 has a data output 53 via which the filter device 43 delivers filtered data blocks to data lines 54. The filtered data blocks present at data lines 54 no longer contain an indicating data item. The data lines 54 are connected, on the one hand, to an input 55 of a transformation device 56 and to an input 57 of a multiplexer 58. The multiplexer 58 has a second multiplexer input 59 which is connected to an output 61 of the computer operation unit 56 via data lines 60. The multiplexer 58 is controlled by the controller 50 via a control line or selection line 61. The multiplexer 58 also has a multiplexer output 62 which is connected to a data input 64 of a data stream integration device 65 via multiplexer output lines 63. The data stream integration device 65 delivers the decoded binary data via data lines 67 to an output 68 of the decoding device 35 via a data output 66. The data output 68 of the decoding device 35 can be connected to any data sink for receiving the binary data for further data processing.

Figure 6:
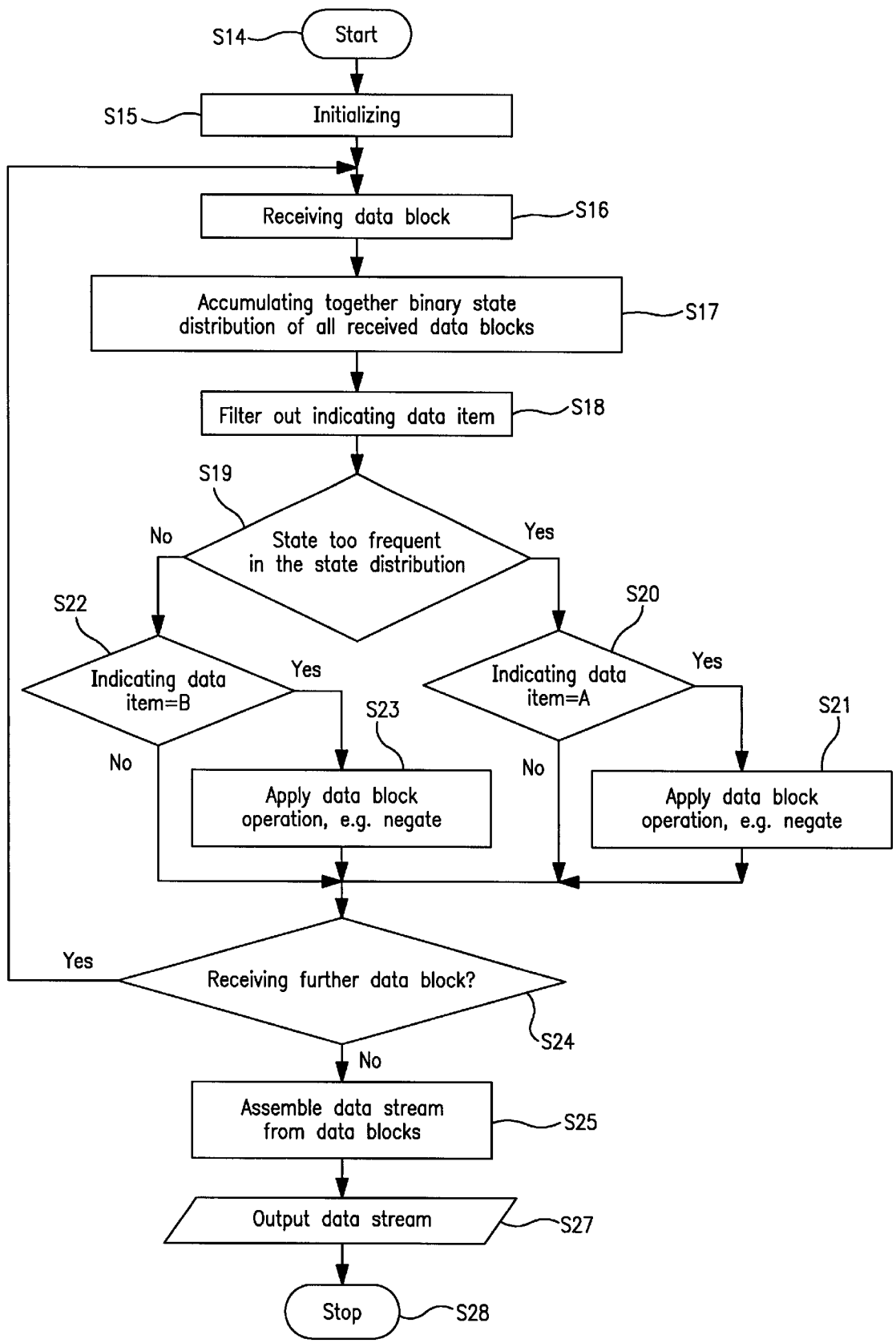
FIG. 6 shows a flow chart for representing the decoding of the transmitted transmit data coded in accordance with the coding method according to the invention.

FIG. 6 shows the decoding process running in the decoding device 35 in detail. After a starting step S14, the decoding device 35 is initialized in an initialization step S15 in which, in particular, the counting device 46 is reset.

In a step S16, the receiving device 39 receives and reads in a data block which is present. In a step S17, the binary state distribution of all received data blocks is accumulated together by the counting device 46. In a step S18, the filter device 43 filters out the indicating data item contained in the received data block and applies the indicating data item, which has been filtered out, to the input 49 of the controller 50 via the indicating data item lines 48. The controller 50 decides in a step S19 if a first binary state exists too many times in the binary state distribution of all received data blocks, or not. If a first binary state occurs too many times in the binary state distribution, the controller 50 determines in step S20 whether the indicating data item present at the input 49 is the indicating data item A which has been added in step S10. If the indicating data item is the indicating data item A, a data transformation or mathematical operation is applied to the filtered data block present at the input 55 by the transformation device 56 in step S21. This data transformation preferably consists in that the filter data block present is negated by the computer operation device 56.

If the controller 56 finds in step S19 that a first binary state does not occur very frequently in the binary state distribution of all received data blocks accumulated together, a check is made in a step S22 whether the indicating data item filtered out by the filter device 43 is the indicating data item B which was added in step S9. If the indicating data item is the indicating data item B, the transformer device 56 performs a data transformation in a step S23 by, for example, negating the filtered data block. For this purpose, the controller 50 drives the multiplexer 58 via the control line 61 in such a manner that the output 61 of the transformation device 56 is switched through to the multiplexer output 62 of the multiplexer 58. If it is found in step S22 that the indicating data item is not the indicating data item B, the controller 50 drives the multiplexer 58 in such a manner that the first multiplexer input 57 is switched through to the multiplexer output 62.

In a step S24, a check is made whether another data block has been received for the receiving device 39 of the decoding device 35 or not. If another data block has been received, the method returns to step S16. If no further data block has been received, the data stream integration device 65 assembles the data stream from the data blocks switched through via the multiplexer 58 in step S25. In step S26, the assembled data stream is output at data output 68 by the decoding device 35. The decoding method is terminating in step S28.

Figure 1:
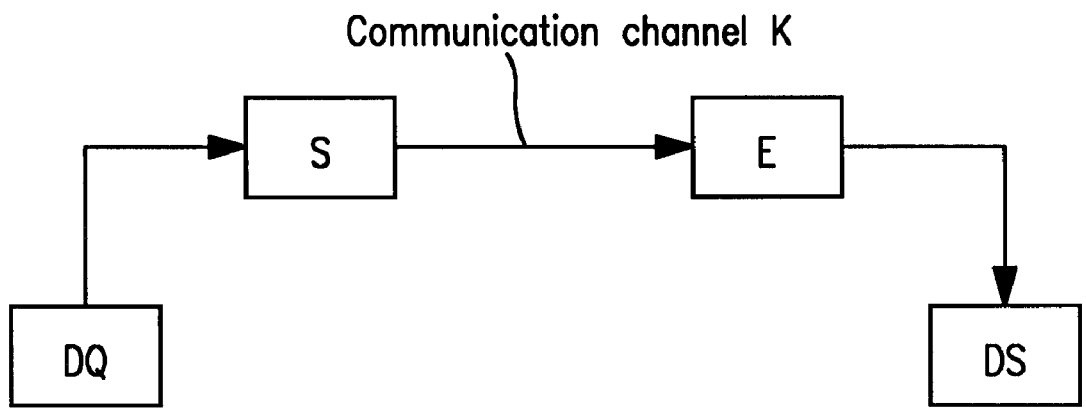
FIG. 1 shows a data transmission link for transmitting coded signals in accordance with the prior art.
Figure 2:
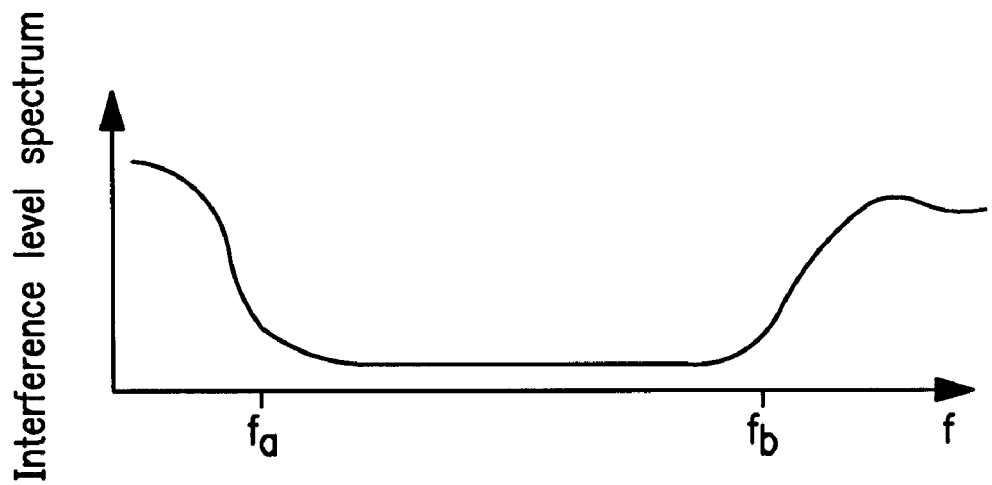
FIG. 2 shows an interference signal spectrum of a communication channel for explaining the problems forming the basis of the invention.

The coding method according to the invention, and the associated decoding method, make it possible to code any data stream of binary data, which is output by a data source DQ, in such a manner that the coded transmit data have a particular transmit signal spectrum. For example, the binary data to be coded can be coded in such a manner that its transmit signal spectrum is located within the frequency band between frequency $f_a$ and frequency $f_b$ in FIG. 2. The interference level spectrum is minimum within this frequency range so that the data coded in accordance with the method according to the invention, which are transmitted via the communication channel K, are only exposed to minimum interference signals. This minimizes the probability of the occurrence of errors in the data transmission. The predetermined transmit signal spectrum which is achieved by the coding method according to the invention can be any predetermined transmit signal spectrum. For example, the predetermined transmit signal spectrum can be a transmit signal spectrum having a minimum direct-current component or a transmit signal spectrum having a minimum high-frequency signal component.

The coding method according to the invention is particularly suitable in the case of communication channels K which are exposed to very high interference signal levels in particular frequency ranges, especially in bus lines in vehicle control systems and in wireless communication channels as used in mobile radio.

What is claimed is:

1. A method for digitally coding binary data with a particular transmit signal spectrum, the method exhibiting the following steps:
   (a) separating a digital data stream, which consists of the binary data to be coded, into data blocks DB having a predetermined data block length,
   (b) determining a difference between the number of binary data having a first binary state and the number of binary data having a second binary state, for each data block DB;
   (c) transmitting each data block as transformed data block or as non-transformed data block via a communication channel K, in such a manner that the total sequence of data blocks transmitted on the communication channel K has the particular transmit signal spectrum.

2. The method as claimed in claim 1, wherein the transformed data block is a data block which has been negated bit by bit.

3. The method as claimed in claim 1, wherein at least one indicating data item which specifies whether the transmitted data block has been transformed or not is added to each data block transmitted.

4. The method as claimed in claim 1, wherein the binary data are coded by means of NRZ methods.

5. The method as claimed in claim 1, wherein the data blocks in each case exhibit the same data block length.

6. The method as claimed in claim 1, wherein the particular transmit signal spectrum exhibits a minimum direct-current component.

7. The method as claimed in claim 1, wherein the transmit signal spectrum exhibits a minimum high-frequency signal component.

8. A coding device for coding binary data with a particular transmit signal spectrum, the coding device exhibiting the following:
   (a) a data stream separating device for separating a data stream which consists of the binary data to be coded, into data blocks having a predetermined data block length
   (b) a calculating device for calculating the difference between the number of binary data having a first binary state and the number of binary data having a second binary state, for each data block; and
   (c) a transmitting device for transmitting each data block as transformed data block or as non-transformed data block via a communication channel connected to the transmitting device, in such a manner that the total sequence of the data blocks transmitted by the transmitting device of the communication channel exhibits the particular transmit signal spectrum.

9. The coding device as claimed in claim 8, wherein the communication channel is a data transmission line.

10. The coding device as claimed in claim 8, wherein the communication channel is a wireless transmission link.

* * * * *